United States Patent
Hill et al.

(10) Patent No.: US 9,021,531 B2
(45) Date of Patent: *Apr. 28, 2015

(54) VIDEO SEARCHING USING TV AND USER INTERFACES THEREFOR

(71) Applicant: Sony Corporation, Tokyo (JP)

(72) Inventors: Seth Hill, La Mesa, CA (US); Jaime Chee, San Diego, CA (US); Ted Mark Dunn, Carlsbad, CA (US)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/013,863

(22) Filed: Aug. 29, 2013

(65) Prior Publication Data

US 2014/0013358 A1 Jan. 9, 2014

Related U.S. Application Data

(63) Continuation of application No. 13/152,757, filed on Jun. 3, 2011, now Pat. No. 8,589,982.

(51) Int. Cl.
*H04N 5/445* (2011.01)
*H04N 21/462* (2011.01)
*H04N 21/4722* (2011.01)
*H04N 21/482* (2011.01)

(52) U.S. Cl.
CPC ....... *H04N 21/4622* (2013.01); *H04N 21/4722* (2013.01); *H04N 21/4828* (2013.01)

(58) Field of Classification Search
CPC .................. H04N 21/472; H04N 21/4722
See application file for complete search history.

(56) References Cited

U.S. PATENT DOCUMENTS

| | | | |
|---|---|---|---|
| 5,425,077 A | 6/1995 | Tsoi |
| 5,633,912 A | 5/1997 | Tsoi |
| 5,675,390 A | 10/1997 | Schindler et al. |
| 5,835,087 A | 11/1998 | Herz et al. |
| 6,177,931 B1 | 1/2001 | Alexander et al. |
| 6,341,374 B2 | 1/2002 | Schein et al. |
| 6,876,901 B2 | 4/2005 | DiLorenzo |
| 7,293,275 B1 | 11/2007 | Krieger et al. |
| 7,698,263 B2 | 4/2010 | Pickelsimer et al. |
| 7,865,927 B2 | 1/2011 | Brodersen et al. |
| 8,291,451 B2 | 10/2012 | Roberts et al. |
| 8,589,982 B2 | 11/2013 | Hill et al. |

(Continued)

OTHER PUBLICATIONS

Seth Guy Hill, Ted Mark Dunn, Jaime Chee, "Video Searching Using TV and User Interfaces Therefor", file history of related U.S. Appl. No. 13/275,817, filed Oct. 18, 2011. (201003603.01-1168.537).

(Continued)

*Primary Examiner* — Gigi L Dubasky
(74) *Attorney, Agent, or Firm* — John L. Rogitz

(57) ABSTRACT

Using a TV, a viewer watching broadcast TV or Internet video content on a display can select a "Video Search" application indicating viewer desire to obtain information about a currently playing video program. The application is invoked to send a name of the currently playing video program to a server on the Internet and associated with a database to cause the server to execute a search only of the database associated with the Internet server and not to execute a search of the Internet. The server returns metadata related to the currently playing video program, which is presented on the display along with the currently playing video program.

12 Claims, 8 Drawing Sheets

(56) References Cited

U.S. PATENT DOCUMENTS

| | | |
|---|---|---|
| 8,615,776 B2 | 12/2013 | Hill et al. |
| 2001/0001160 A1 | 5/2001 | Shoff et al. |
| 2001/0037238 A1 | 11/2001 | Gotoh et al. |
| 2002/0056090 A1 | 5/2002 | Wagner et al. |
| 2002/0147984 A1 | 10/2002 | Tomsen et al. |
| 2003/0007012 A1 | 1/2003 | Bate |
| 2006/0026638 A1 | 2/2006 | Stark et al. |
| 2006/0262116 A1 | 11/2006 | Moshiri et al. |
| 2007/0204297 A1 | 8/2007 | Gonzalez |
| 2008/0066100 A1 | 3/2008 | Brodersen et al. |
| 2008/0276278 A1 | 11/2008 | Krieger et al. |
| 2009/0019489 A1 | 1/2009 | Ohlfs et al. |
| 2009/0059091 A1* | 3/2009 | Dorsey .......... 348/734 |
| 2009/0199242 A1* | 8/2009 | Johnson et al. .......... 725/46 |
| 2009/0222757 A1 | 9/2009 | Gupta et al. |
| 2009/0276722 A1 | 11/2009 | Segel |
| 2010/0186038 A1* | 7/2010 | Thomas et al. .......... 725/42 |
| 2010/0293577 A1 | 11/2010 | Hnyk et al. |
| 2010/0299701 A1 | 11/2010 | Liu et al. |
| 2010/0319027 A1 | 12/2010 | Kim |
| 2011/0138423 A1 | 6/2011 | Pickelsimer et al. |
| 2011/0289529 A1 | 11/2011 | Jordan et al. |
| 2012/0278844 A1* | 11/2012 | Curtis et al. .......... 725/93 |

OTHER PUBLICATIONS

Amazon.com "IMBD (Internet Movie Database)", product launch date 1990. website print out Oct. 18, 2011.

Seth Guy Hill, Ted Mark Dunn, Jamie Chee, "Video Searching Using TV and User Interfaces Therefor" related U.S. Appl. No. 13/275,817, applicants response to non-final office action filed May 12, 2014. (201003603.01-1168.537).

Seth Guy Hill, Ted Mark Dunn, Jamie Chee, "Video Searching Using TV and User Interfaces Therefor" related U.S. Appl. No. 13/275,817, final office action dated Jul. 16, 2014. (201003603.01-1168.537).

Seth Guy Hill, Ted Mark Dunn, Jamie Chee, "Video Searching Using TV and User Interfaces Therefor" related U.S. Appl. No. 13/275,817, applicants response to final office action filed Aug. 25, 2014. (201003603.01-1168.537).

Seth Guy Hill, Ted Mark Dunn, Jamie Chee, "Video Searching Using TV and User Interfaces Therefor" related U.S. Appl. No. 13/275,817, Examiner's answer dated Nov. 20, 2014. (201003603.01-1168.537).

Seth Guy Hill, Ted Mark Dunn, Jamie Chee, "Video Searching Using TV and User Interfaces Therefor" related U.S. Appl. No. 13/275,817, applicant's response to Examiner's answer filed Nov. 25, 2014. (201003603.01-1168.537).

* cited by examiner

Overall Logic

"Search Apps" Logic

FIG. 8

Video Search | Cast

Movie "A" HD (release year)

| | |
|---|---|
| Photo | Director's name |
| Photo | Writer's name |
| Photo | Writer's name |
| Photo | Actor #1 name |
| Photo | Actor #2 name |

Available On: W/S A, W/S B, BIV, TV, Q

Sidebar: Graphic, Video, Cast, Related, Text Search, History, Bookmarks

FIG. 9

Video Search | Cast

Actor Name

- Name (Actor)
- Birth Date
- Birth Place
- Actor Bio

Search Apps | Add to Bookmarks | More

Available On: W/S A, W/S B, BIV, TV, Q

Sidebar: Graphic, Video, Cast, Related, Text Search, History, Bookmarks

VIDEO SEARCHING USING TV AND USER INTERFACES THEREFOR

FIELD OF THE INVENTION

The present application relates generally to video searching using TVs and user interfaces (UI) related to the searching.

BACKGROUND OF THE INVENTION

Audio video (AV) devices such as TVs are growing increasingly capable, enabling viewers to watch videos from a wide range of sources with concomitant features. As understood herein, presenting additional information to viewers in an easy, intuitive, and non-cluttered way is desirable as more consumers demand increased access to supplemental information without wanting to operate computers to obtain the information.

SUMMARY OF THE INVENTION

An audio video (AV) device includes a video display and a processor accessing instructions on a computer readable medium to execute the instructions to control the display to present a user interface (UI) on the display. The UI includes at least a video tab and a cast tab. Responsive to selection of the video tab in a seed mode of "video", the processor presents on the UI a description of a currently input AV program to the device. On the other hand, the processor, responsive to selection of the video tab in a seed mode of "cast", presents on the UI names of plural AV programs other than the currently input AV program with which a currently designated person associated with the currently input AV program is also associated. In further contrast, responsive to selection of the cast tab in the seed mode of "video", the processor presents on the UI names of plural people associated with the currently input AV program, whereas responsive to selection of the cast tab in a seed mode of "cast" the processor presents on the UI biographic information of the currently designated person.

The UI may further include a "related" tab selection of which causes the processor to present on the UI AV programs associated with the currently input AV program including differently edited versions of the currently input AV program. In example embodiments the UI can include a "text search" tab selectable to cause the processor to present on the display the UI along with a pop-window overlaid thereon, permitting a user to select from a video category and a cast member category and no other categories. The window can include a pane into which a user can enter one or more search terms. The processor executes a search on the selected category using the one or more search terms.

Still further, the UI can have a "history" tab selectable to present a list of recently viewed AV programs. If desired, the UI may include a "bookmark" tab selectable to present a list of recently viewed AV programs. The processor receives selection of an AV program on the list of recently viewed AV programs when the bookmark tab is invoked and in response to the selection adds the AV program to a bookmark file.

In some implementations the UI presents a seed name and a "search" selector element. The processor, responsive to selection of the "search" selector element, presents on the display a search pop-up window presenting a list of applications and/or services. The processor receives selection of an application and/or service from the list and responsive thereto passes the seed name to the application and/or service selected by the user to execute a non-Internet database search using the seed name. The processor executes the application and/or service selected by the user to present results of the search on the display. The example search pop-up window may also include a textual representation of a video or cast member selectable to search for content related to the video or cast member. The search pop-up window can further present an icon and title of the video or cast member and an icon associated with a service and a name of a search item.

The UI may further display a seed name and a column of icons representing respective AV program sources including at least one TV signal source and at least one Internet source. The icons represent sources from which content related to the seed name is available. An icon is selectable to cause the content related to the seed name to be received from the respective source.

In another aspect, a method includes receiving, from a viewer watching broadcast TV or Internet video content on a display, selection of a "Video Search" application indicating viewer desire to obtain information about a currently playing video program. Responsive to selection of the "Video Search" application, the "Video Search" application is invoked and executed to send a name of the currently playing video program to a server on the Internet and associated with a database. This causes the server to execute a search only of the database associated with the Internet server and not to execute a search of the Internet. The method includes receiving from the server metadata related to the currently playing video program, with the metadata including information about the currently playing video program and the cast thereof. Information from the metadata is presented on the video display along with the currently playing video program.

In another aspect, an audio video (AV) device includes a video display presenting a currently input AV program and a processor accessing instructions on a computer readable medium to execute the instructions to control the display to present a user interface (UI) on the display. The UI presents a seed name and a "search" selector element. The processor, responsive to selection of the "search" selector element, presents on the display a search pop-up window presenting a list of applications and/or services. The processor receives selection of an application and/or service from the list and responsive thereto passes the seed name to the application and/or service selected by the user to execute a non-Internet database search using the seed name. The processor executes the application and/or service selected by the user to present results of the search on the display.

The details of the present invention, both as to its structure and operation, can best be understood in reference to the accompanying drawings, in which like reference numerals refer to like parts, and in which:

BRIEF DESCRIPTION OF THE DRAWINGS

FIG. 8 is a screen shot of a UI that is presented responsive to selection of the cast tab and the seed is "video";

FIG. 9 is a screen shot of a UI that is presented responsive to selection of the cast tab and the seed is "cast";

DETAILED DESCRIPTION OF THE PREFERRED EMBODIMENT

Figure 1:
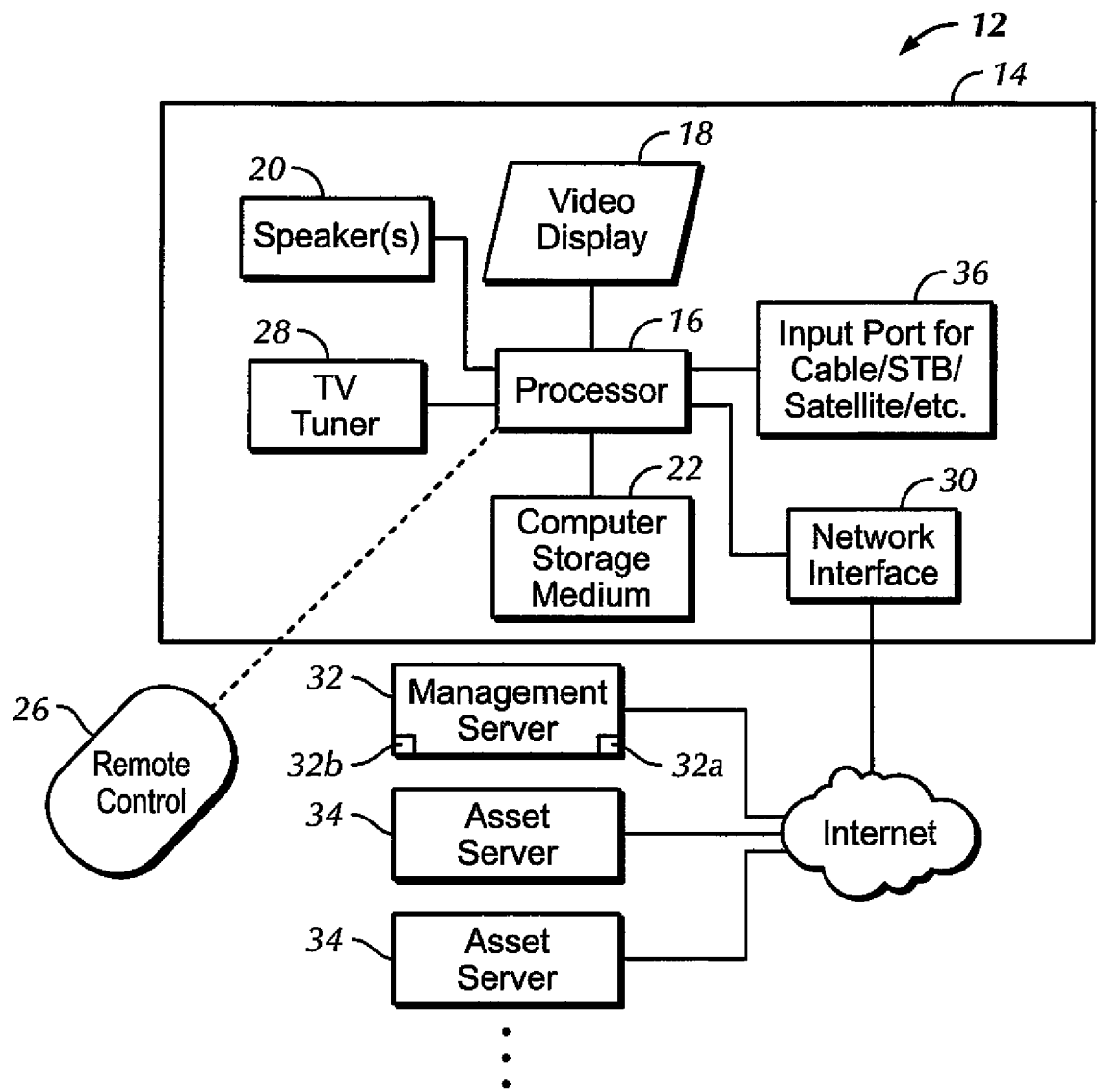
FIG. 1 is a block diagram of an example system in accordance with present principles.

Referring initially to FIG. 1, an audio video (AV) display device 12 such as a TV includes a housing 14 bearing a digital processor 16. The processor 16 can control a visual display 18 and an audible display 20 such as one or more speakers. The visual display may be a touch screen display or high definition TV display or other appropriate video display.

To undertake present principles, the processor 16 may access one or more computer readable storage media 22 such as but not limited to RAM-based storage (e.g., a chip implementing dynamic random access memory (DRAM)) and/or flash memory and/or disk-based storage. Software code implementing present logic executable by the AV device 12 may be stored on one of the memories to undertake present principles.

If desired, in addition to the touch screen the processor 16 can receive user input signals from various input devices, including a keypad, a remote control device 26, a point and click device such as a mouse, etc. A TV tuner 28 may be provided in some implementations particularly when the CE device is embodied by a TV to receive TV signals from a source such as a set-top box, satellite receiver, cable head end, terrestrial TV signal antenna, etc. Signals from the tuner 28 are sent to the processor 16 for presentation on the display 18 and speakers 20.

As shown in FIG. 1, a network interface 30 such as a wired or wireless modem or wireless telephony transceiver communicates with the processor 16 to provide connectivity to one or more Internet servers, including a management server 32 with respective processors 32*a* and respective computer readable storage media 32*b*. The management server 32 may provide the AV device 12 with selective access to AV content from one or more asset servers 34. One or more AV input ports 36 can also be provided to receive television programming from respective sources including a disk player, a set top box, a cable head end, a satellite, a terrestrial broadcast antenna.

Figure 2:
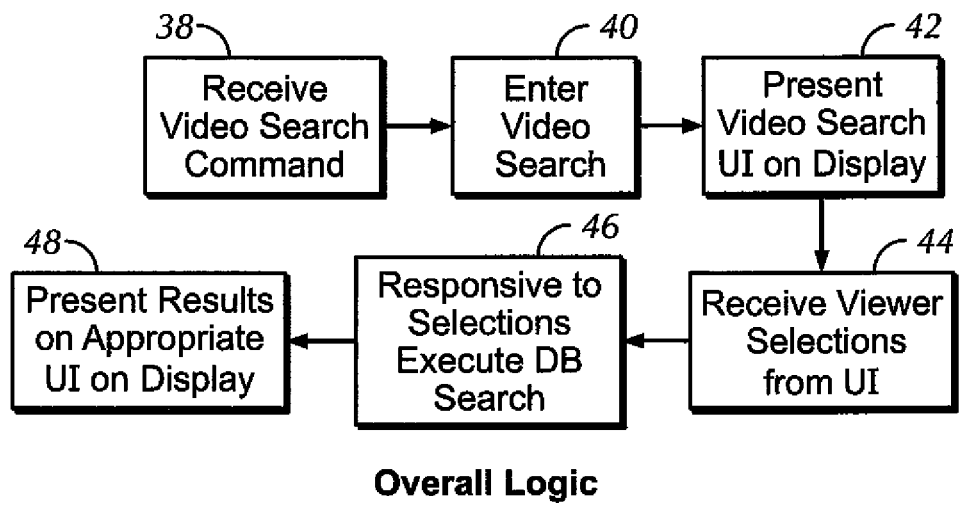
FIG. 2 is a flow chart showing example overall logic in accordance with present principles.
Figure 3:
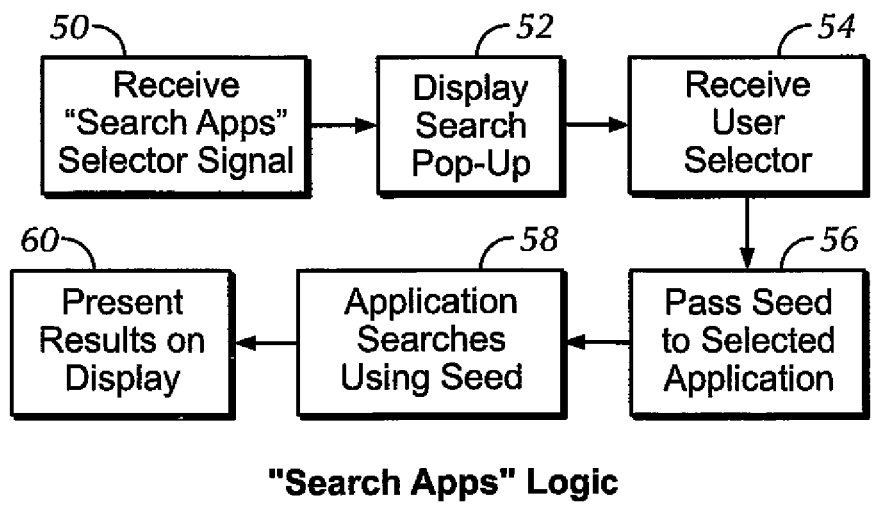
FIG. 3 is a flow chart showing example "search apps" logic.

FIGS. 2 and 3 illustrate logic that the processor 16 accessing the medium 22 may execute. Commencing at block 38 a video search command is received from a viewer operating the below-described user interface (UI) shown in FIG. 4. A video search algorithm is entered at block 40 to present on the display 18 a search UI at block 42. An example search UI is described further below in reference to FIG. 5.

Proceeding to block 44, user selections are received from the search UI. At block 46, responsive to the user selections a database (not Internet) search is conducted for matching content, with results being presented on display 18 at block 48.

FIG. 3 shows more specific search logic. Commencing at block 50, the processor receives from a viewer operating the UI of FIG. 4, a window (labeled "Content Area") of which presents broadcast TV or Internet video content, a selection of a "Video Search" application indicating viewer desire to obtain information about a currently playing video program. The video search application allows users to search for information about videos and cast members and can be entered by manipulating, e.g., the RC 26 to select a "search apps" selector element 51 on the UI of FIG. 4.

Figure 4:
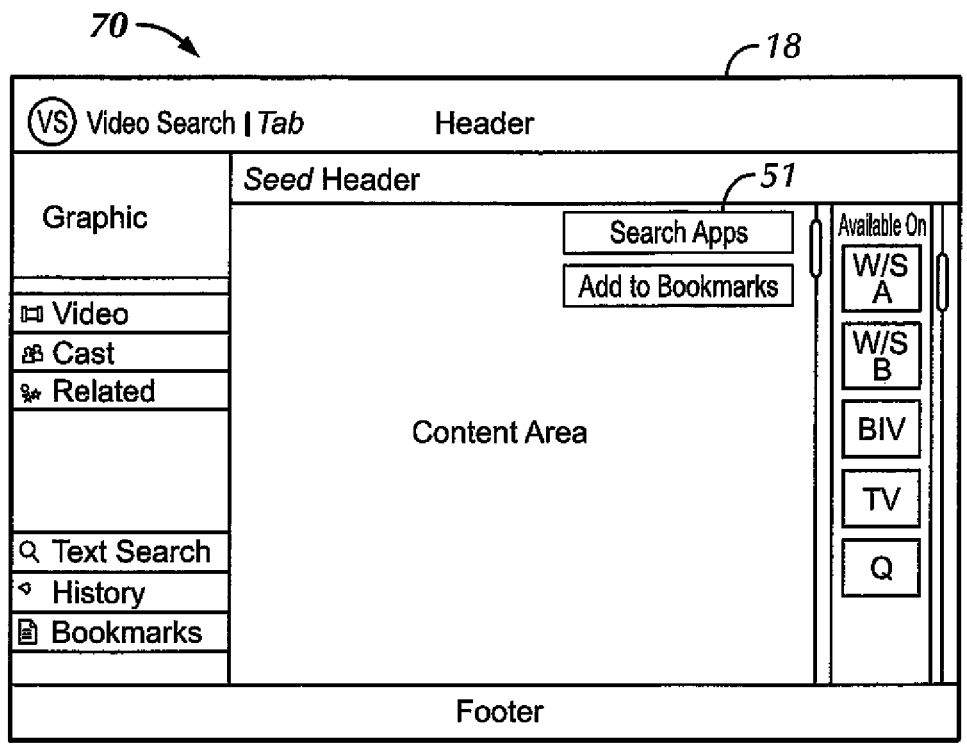
FIG. 4 is a screen shot of a user interface (UI) illustrating various portions and selector elements.
Figure 5:
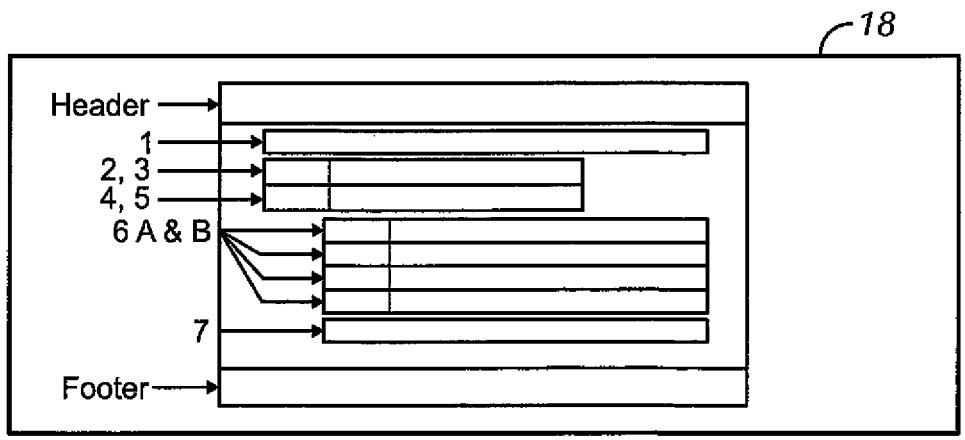
FIG. 5 is a screen shot of a search UI.

Responsive to selection of the "Video Search" application, at block 52 the pop-up UI of FIG. 5 is overlaid onto the UI of FIG. 4, although in some embodiments the UI of FIG. 5 can completely replace the UI of FIG. 4. In any case, a user selection of a "seed" such as a video title or cast member name is received at block 54 and passed to a selected application at block 56. The application searches a predetermined database at block 58 for matching content and returns the content for presentation on the display 18 at block 60.

In the UI shown in FIG. 5, a header may be presented as shown, and the "seed" entered into block #1. The seed may be entered by typing in the name of a title or person and may be automatically correlated to the "video" genus by searching a database of video names and responsive to a match being found, inferring that the viewer has entered a "seed" which is a video title. Similarly, the seed may be automatically correlated to the "cast" genus by searching a database of person names and responsive to a match being found, inferring that the viewer has entered a "seed" which is a cast member name. Or, the viewer may directly enter "video" or "cast" or may toggle between "video" and "cast" using the RC 26.

Block #2 in FIG. 5 may be a video icon when "video" is the seed and block #3 may be the entered video title. Likewise, when "cast" is the seed block #3 may be an icon (e.g., photo) of the selected cast member and block #4 may be the cast title, either personal name, character name, etc. Rows 4 and 5 may be reserved and row #6A and 6B may be an icon and item name, respectively, associated with a selected application, e.g., an Internet TV application or a music search application. Line #7 may be a help text field.

FIGS. 6-14 illustrate various configurations that may be assumed by the UI shown in FIG. 4, hereinafter designated UI 70. In the example shown, the UI 70 includes a left-most column of tabs, in order from top to bottom a video tab 72 (which is depicted as being selected in FIGS. 6 and 7), a cast tab 74 (selected in FIGS. 8 and 9), a related tab 76 (selected in FIG. 10), a text search tab 78 (selected in FIG. 12), a history tab 80 (selected in FIG. 13), and a bookmarks tab 82 (selected in FIG. 14). As discussed further below, the UI 70 can be used to provide links that allow users to navigate to videos and cast members related to content in the main information/video area discussed further below. This creates an "exploratory" environment, enabling users to jump from one group of information to another. The users can access information about the currently playing video. Or the users can access a keyboard in order to enter and then search for any video topic or music track played on the AV device 12.

Figure 6:
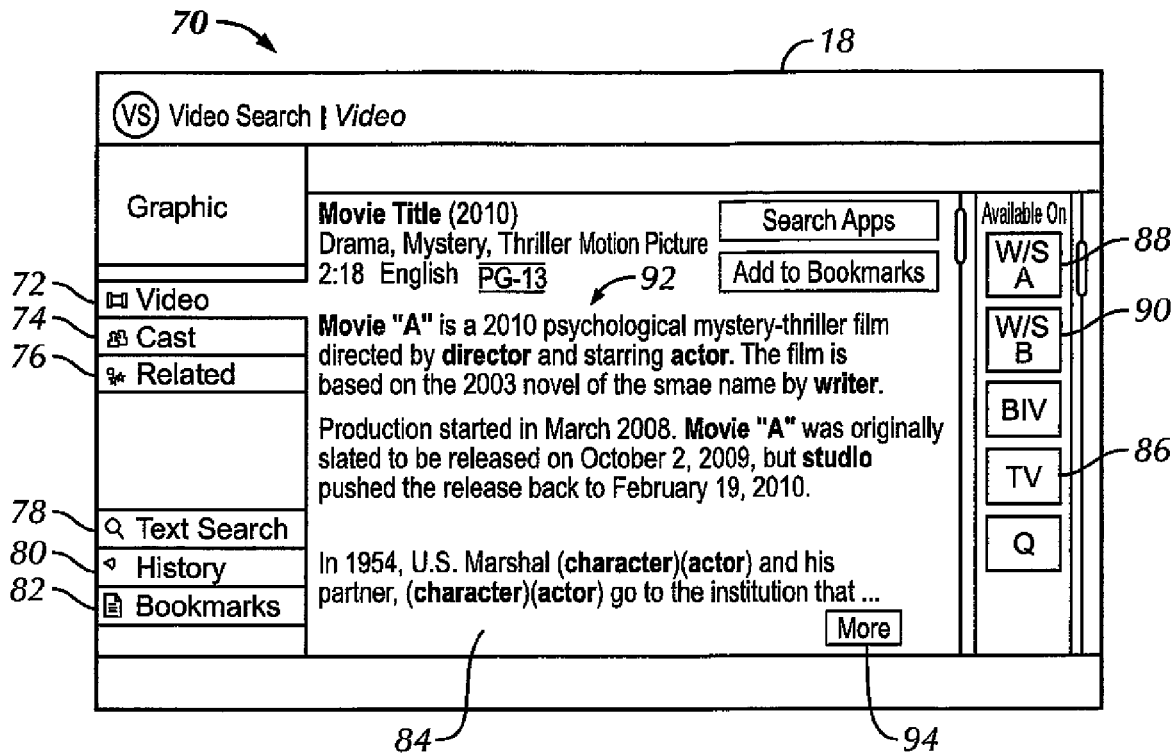
FIG. 6 is a screen shot of a UI that is presented responsive to selection of the video tab and the seed is "video"

As shown in FIG. 6, moving to the right on the display 18 a main information/video area 84, labeled "content area" in FIG. 4, occupies the majority of the display area. Description below follows as to what is presented in the main information area 84.

To the right of the main information area 84, in some example implementations a column of selector elements or icons may be presented which a viewer can select respective AV program sources including at least one TV signal source (associated with an icon 86) and at least one Internet source (Internet sources are associated with website icons 88, 90).

The icons represent sources from which content related to the seed name is available. An icon is selectable to cause the content related to the seed name to be received from the respective source.

FIG. 6 shows that responsive to selection of the video tab 72 in the above-described seed mode of "video", the processor 16 presents in the main information area 84 of the UI 70 a description 92 of a currently input AV program to the device 12, in the example shown, "movie A". The description, like the other supplemental information described herein responsive to the selection of various tabs, may be downloaded from the management server 32 accessing various asset servers 34. The description can include the year of release of the program, its genre, run time, and language as shown in FIG. 6. Also, the description can include, as shown, a brief summary of the movie connections, production information, and a plot summary. A "more" selector element 94 can be selected to scroll the screen up for additional information on the current AV program.

Figure 7:
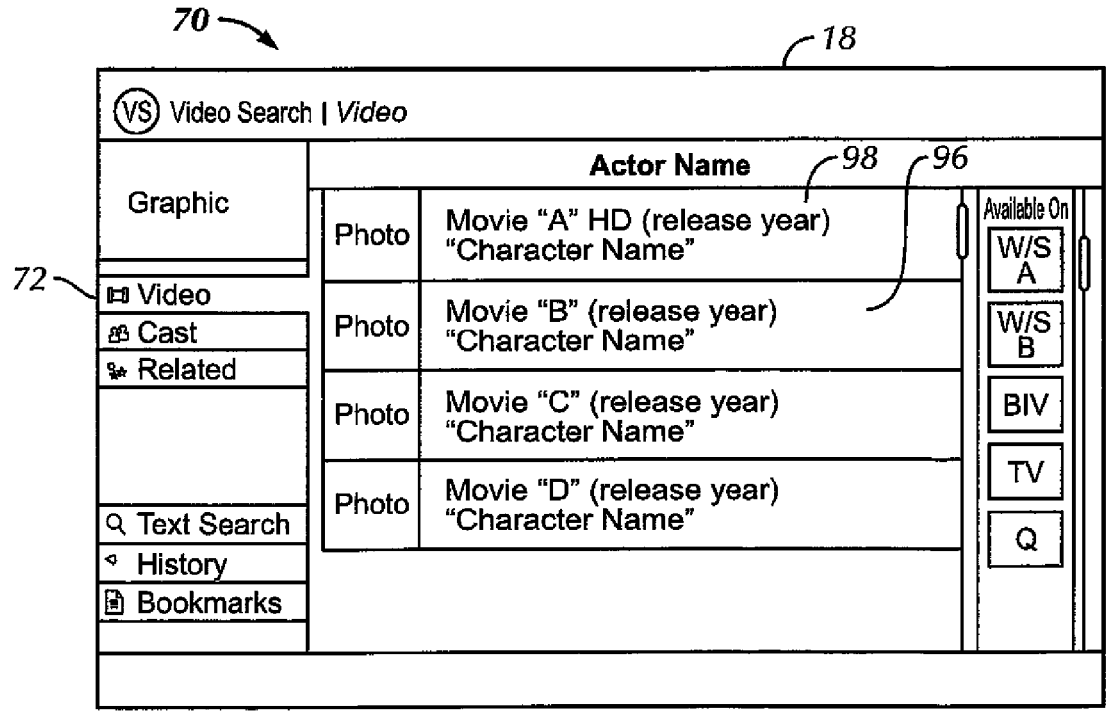
FIG. 7 is a screen shot of a UI that is presented responsive to selection of the video tab and the seed is "cast"

On the other hand, responsive to selection of the video tab 72 in the seed mode of "cast", as shown in FIG. 7 titles 96 are presented of AV programs other than the currently input AV program 98, with the titles 96 also starring or otherwise associated with a currently designated person associated with the currently input AV program 94. Along with each title 96, the actor's character name in the underlying AV program can be presented as shown along with a release year for that program and if desired, to the left of the title, a photo, e.g., of the actor in the character role.

In further contrast, FIG. 8 shows that responsive to selection of the cast tab 74 while in the seed mode of "video", the UI names of people associated with the currently input AV program and, if desired, their photos, whereas responsive to selection of the cast tab 74 in a seed mode of "cast" (FIG. 9) the processor presents on the UI biographic information of the currently designated person including, e.g., the person's name, date and place of birth, and a brief biography.

Figure 10:
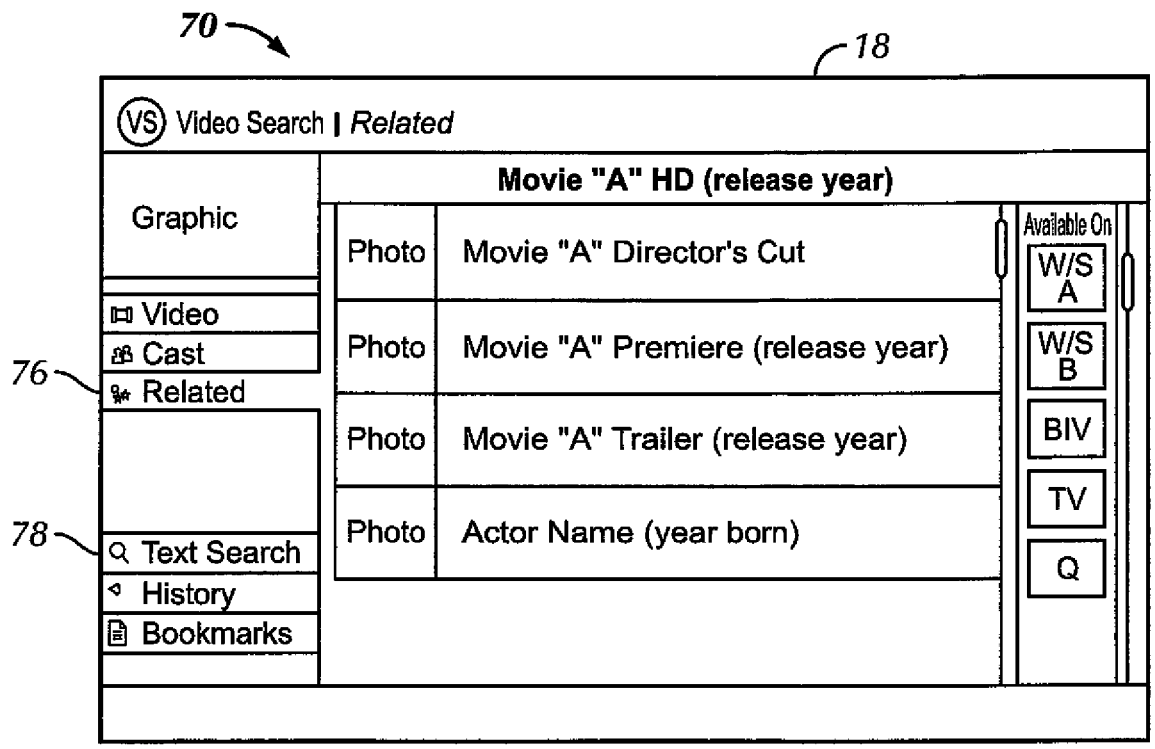
FIG. 10 is a screen shot of a UI that is presented responsive to selection of the "related" tab (seed must be "video")
Figure 11:
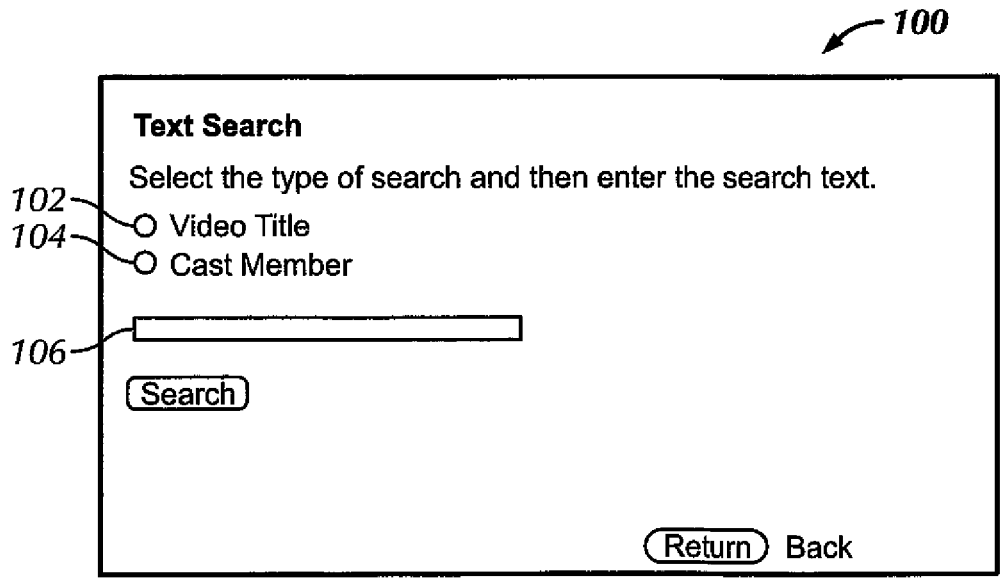
FIG. 11 is a screen shot of a text search pop-up window that is presented when the text search tab is selected.
Figure 12:
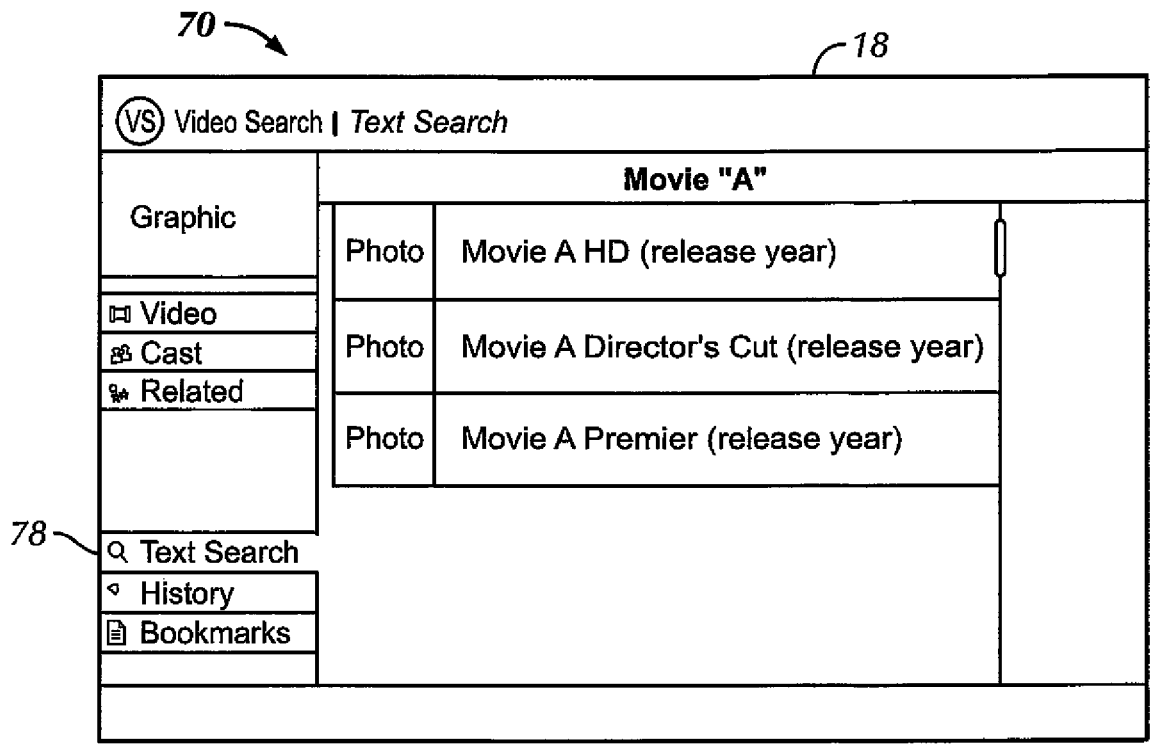
FIG. 12 is a screen shot of a UI that presents results of the search entered from the UI of FIG. 11.

FIG. 10 shows that selection of the related tab 76 causes the processor 16 to present on the UI AV programs that are associated with the currently input AV program including differently edited versions of the currently input AV program, e.g., "premier", "High definition", "trailer", etc. On the other hand, when the text search tab 78 is selected a pop-window 100 may be overlaid on the main UT 70. The pop up window 100 as shown permits a user to select from a video category 102 and a cast member category 104, and in example embodiments no other categories are selectable. The window 100 can include a pane 106 into which a user can enter one or more search terms. The processor executes a search on the selected category using the one or more search terms and then precipitate a search of, e.g., the management server 32 and asset servers 34 only by selecting "search". FIG. 12 shows that when the search is complete the window 100 is removed and the UI 70 presents a list of video programs that confirm to the query input into the window 100, including accompanying photos if desired and release year.

Figure 13:
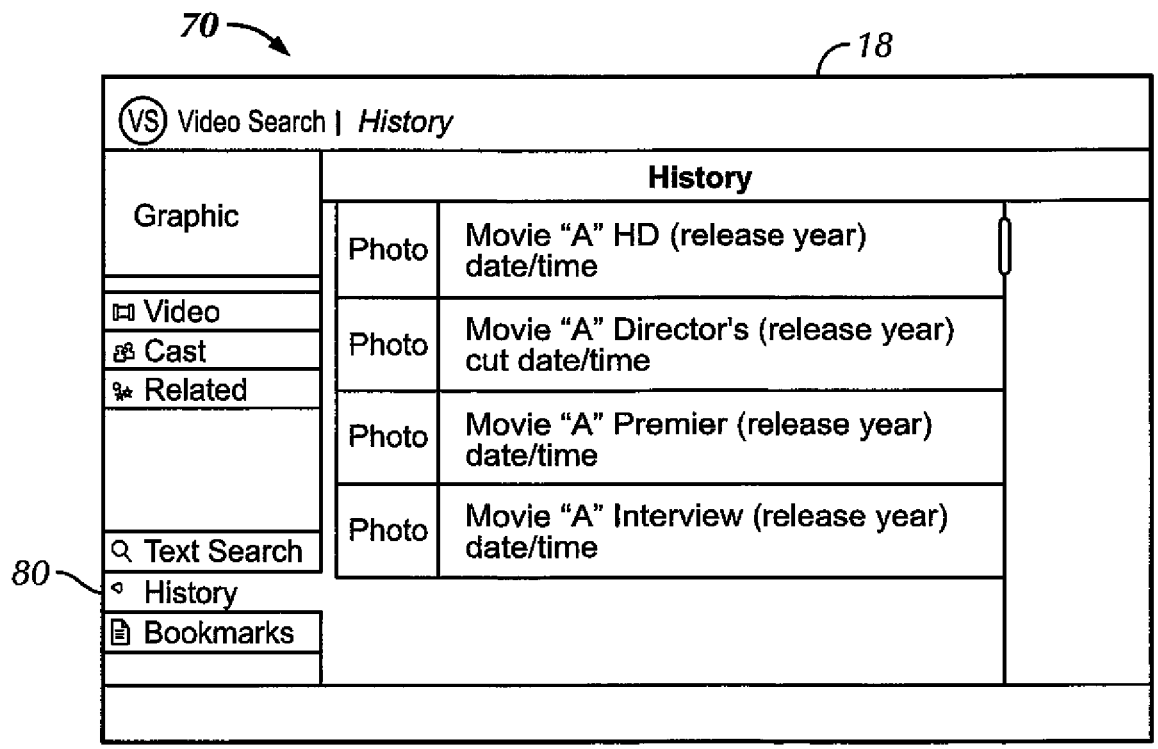
FIG. 13 is a screen shot of a UI that is presented responsive to selection of the seed history tab (seed can be "video" or "cast")
Figure 14:
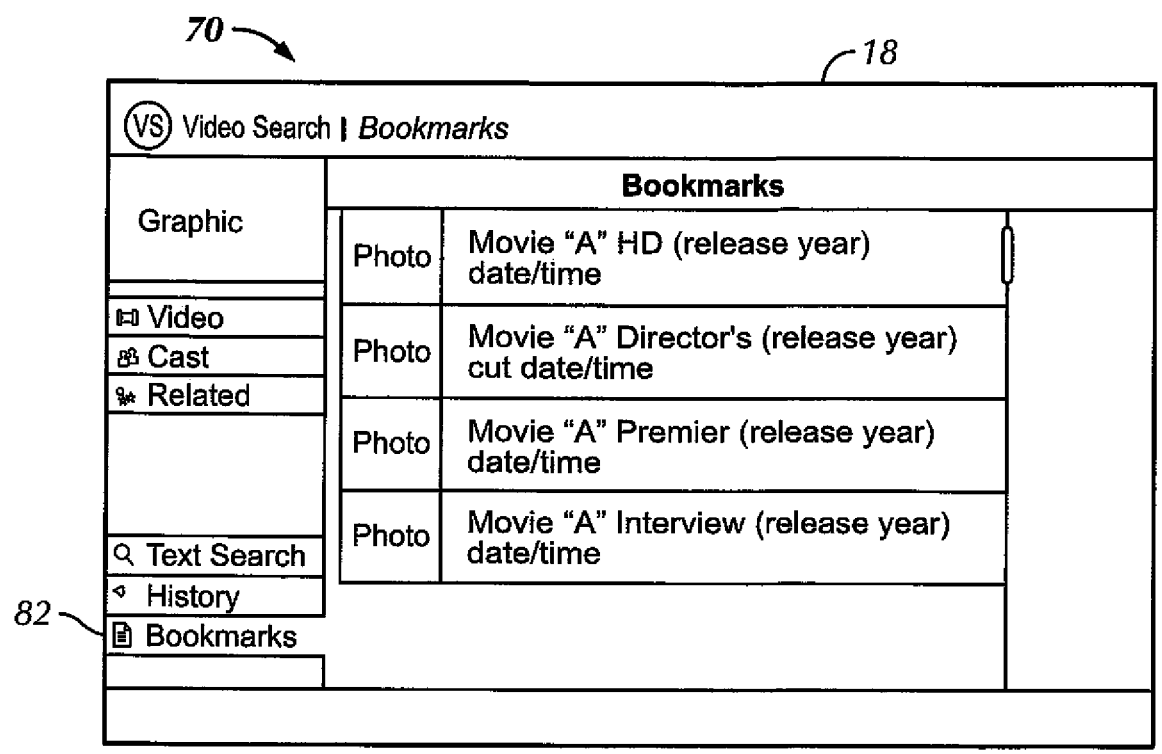
FIG. 14 is a screen shot of a UI that is presented responsive to selection of the bookmark tab.

Still further, selection of the "history" tab 80 as shown in FIG. 13 causes the UI 70 to present a list of recently viewed AV programs. FIG. 14 illustrates that selection of the "bookmark" tab 82 causes the UI 70 to present a list of recently viewed AV programs. The processor 16 can receive selection of an AV program on the list of recently viewed AV programs when the bookmark tab is invoked and in response to the selection add the AV program to a bookmark file.

Additional details related to the principles described above follow.

TABLE 1

Video Search Areas

| Area | Content Tabs: Video, Cast, Related | Feature Tabs: Text Search, History, Bookmarks |
|---|---|---|
| Header | Application header | |
| Graphic | Seed image | Image for the feature |
| Tab Navigation | Mechanism to select the desired tab. Users scroll up and down to navigate between the tabs. | |
| Seed Header | Content type icon & Seed of search | Text Search: Content type icon & Search string (or blank if no seed) History & Bookmarks: Title of tab |
| Content Area | Information about the seed, Add to Bookmarks button*, Search Apps button* *Details View only | Search: Search Results History: History of selected seeds Bookmarks: List of user-saved seeds. |
| Search Apps button | Initiate Search Apps feature - hidden in list view | Not displayed |
| Add to Bookmarks button | Add current seed to Bookmarks - hidden in list view | Not displayed |
| Links | Links related to content area. | Not displayed |
| Footer | Application footer | |

*This is the text displayed in the footer when the focus is on a tab. When the focus is on a text screen (pop-up window), the text string for <RETURN> is "Back."

Format of the Content Area

The Content area can present data in two formats: details view and list view.

Details view: one result with many details about the result. Often includes paragraphs of description. For an example, refer to the Video tab when the seed=video.
   List view: many results with few details about each result. For an example, refer to the Video tab when the seed=cast If there is no seed, then the Content tabs may be grayed out, in which case the UI 70 never gives them focus. The text in the seed header area depends upon the tab. For Video, Cast, or Related Tabs, the content type icon and seed may be displayed, but if there is no seed, users in some embodiments cannot access these tabs, For the text search tab content type icon and search string are displayed and if the user has not yet performed a search, then the header may display a generic text search icon and the string "text search."

When the user selects the add to bookmarks button, the UI adds the current seed as a bookmark. This button is displayed in the content area of the Content tabs, when the tabs are in description view. The button is hidden when the tab is in list view.

As described above, the "Available On" links are links that are related to the seed. They are populated by the server-side database (management server 32). If there is no data from the database, then the UI displays the message, "Nothing available." When a user scrolls to these links, the right pane expands to display text about each item. This content can be refreshed every time the user selects a new seed. The text next to each link is specific to Video Search. Each item can support up to three lines of text. The text is as follows:

Line 1: Name of Service
   Line 2: Name of Video/Cast Member
   Line 3: Cost of Service While the particular VIDEO SEARCHING USING TV AND USER INTERFACES THEREFOR is herein shown and described in detail, it is to be understood that the subject matter which is encompassed by the present invention is limited only by the claims.

What is claimed is:

1. Audio video (AV) device comprising:
at least one non-transitory computer readable medium with instructions executable by at least one processor to configure the processor for:
controlling a display to present a user interface (UI) on the display, the UI including at least a first tab and a second tab;
responsive to selection of the first tab in a first mode, presenting on the UI a description of a currently input AV program to the device;
responsive to selection of the first tab in a second mode, presenting on the UI names of plural AV programs other than the currently input AV program with which a currently designated person associated with the currently input AV program is also associated;
responsive to selection of the second tab in the first mode, presenting on the UI names of plural people associated with the currently input AV program; and
responsive to selection of the second tab in the second mode, presenting on the UI biographic information of the currently designated person.

2. The AV device of claim 1, the UI further comprising a third tab when presented by the processor, wherein the instructions when executed by the processor configure the processor for, responsive to selection of the third tab, presenting on the UI AV programs associated with the currently input AV program including differently edited versions of the currently input AV program.

3. The AV device of claim 1, the further comprising a fourth tab when presented by the processor, wherein the instructions when executed by the processor configure the processor for, responsive to selection of the fourth tab, presenting on the display the UI along with a pop-window overlaid thereon and permitting a user to select from a video category and a cast member category and no other categories, the window including a pane into which a user can enter one or more search terms, the processor configured for executing a search on the selected category using the one or more search terms.

4. The AV device of claim 1, the UI farther comprising a fifth tab when presented by the processor, wherein the instructions when executed by the processor configure the processor for, responsive to selection of the fifth tab, presenting a list of recently viewed AV programs.

5. The AV device of claim 1, the UI further comprising a sixth tab when presented by the processor, wherein the instructions when executed by the processor configure the processor for, responsive to selection of the sixth tab, presenting a list of recently viewed AV programs, wherein the instructions when executed by the processor configure the processor for receiving selection of an AV program on the list of recently viewed AV programs when the sixth tab is invoked and in response to the selection adding the AV program to a bookmark file.

6. The AV device of claim 1, wherein the UI when presented by the processor presents a mode name and a. seventh selector element, wherein the instructions when executed by the processor configure the processor for, responsive to selection of the seventh selector element, presenting on the display it search pop-up window presenting a list of applications and/or services, the processor when accessing the instructions being configured for receiving selection of an application and/or service from the list and responsive thereto passing the mode name to the application and/or service selected by a user to execute a non-Internet database search using the seed name, the processor configured for executing the application and/or service selected by the user presenting results of the search on the display.

7. The AV device of claim 6, wherein the search pop-up window includes a textual representation of a video or cast member selectable to search for content related to the video or cast member, the search pop-up window further presenting an icon and title of the video or cast member, the search pop-up window further presenting an icon associated with a service and a name of a search item.

8. The AV device of claim 1, wherein the UI further includes when presented by the processor a mode name and a column of icons representing respective AV program sources including at least one TV signal source and at least one Internet source, the icons representing sources from which content related to the mode name is available, an icon being selectable to cause the content related to the mode name to be received from the respective source.

9. The AV device of claim 1, wherein the first mode is established based on user input.

10. Method comprising:
receiving, from a viewer watching content on a display, selection indicating viewer desire to obtain information about a currently playing content, the selection being made using a user interface (UI) including at least a first tab and a second tab;
responsive to selection of the first tab in a first mode, presenting a description of the currently playing content;
responsive to selection of the first tab in a second mode, presenting names of plural AV programs other than the currently playing content with which a currently designated person associated with the currently playing content is also associated;
responsive to selection of the second tab in the first mode, presenting names of plural people associated with the currently playing content; and
responsive to selection of the second tab in the second mode, presenting biographic information of a currently designated person.

11. The method of claim 10, further comprising:
receiving from the viewer a search command to search for content related to a video program not being presented on the display;
responsive to the search command, presenting on the display a search tab;
receiving user input to the search tab; and
responsive to the user input to the search tab, sending the user input to the search tab to an Internet server for executing a database search for content related to the user input to the search tab.

12. The method of claim 10, wherein user input is received from a TV remote control or a keyboard and not from a computer.

* * * * *